(12) United States Patent
Hawley et al.

(10) Patent No.: US 6,573,344 B1
(45) Date of Patent: Jun. 3, 2003

(54) PROPYLENE POLYMERIZATION PROCESS

(75) Inventors: Gil R. Hawley, Dewey, OK (US); Max P. McDaniel, Bartlesville, OK (US); Michael D. Jensen, Bartlesville, OK (US); Christopher E. Wittner, Bartlesville, OK (US)

(73) Assignee: Phillips Petroleum Company, Bartlesville, OK (US)

( * ) Notice: Subject to any disclaimer, the term of this patent is extended or adjusted under 35 U.S.C. 154(b) by 49 days.

(21) Appl. No.: 09/599,387

(22) Filed: Jun. 22, 2000

(51) Int. Cl.⁷ .................................................. C08F 4/44
(52) U.S. Cl. ........................... 526/160; 526/64; 526/96; 526/98; 526/99; 526/137; 526/143; 526/126; 526/170; 526/348; 526/943; 526/156
(58) Field of Search ................................ 502/120, 131, 502/132, 128, 169; 526/170, 348, 351, 156, 158

(56) References Cited

U.S. PATENT DOCUMENTS

| | | | |
|---|---|---|---|
| 5,468,440 A | 11/1995 | McAlpin et al. | 264/291 |
| 5,789,502 A | * 8/1998 | Shamshoum et al. | 526/129 |
| 6,316,553 B1 | * 11/2001 | McDaniel et al. | 526/64 |

* cited by examiner

*Primary Examiner*—David W. Wu
*Assistant Examiner*—Rip A Lee
(74) *Attorney, Agent, or Firm*—McDermott, Will & Emery

(57) ABSTRACT

A process to produce a propylene polymer is provided. The process comprising contacting at least one organometal compound, at least one organoaluminum compound, at least one treated solid oxide compound, propylene, and ethylene in a polymerization zone under polymerization conditions to produce the propylene polymer.

27 Claims, No Drawings

this invention is related to the field…

PROPYLENE POLYMERIZATION PROCESS

FIELD OF THE INVENTION

This invention is related to the field of propylene polymerization processes.

BACKGROUND OF THE INVENTION

The production of propylene polymers is a multi-million dollar business. This business produces billions of pounds of propylene polymers each year. Millions of dollars have been spent on developing technologies that can add value to this business.

One of these technologies is called metallocene catalyst technology. Metallocene catalysts have been known since about 1958. However, their low productivity did not allow them to be commercialized. About 1974, it was discovered that contacting one part water with one part trimethylaluminum to form methyl aluminoxane, and then contacting such methyl aluminoxane with a metallocene compound, formed a metallocene catalyst that had greater activity. However, it was soon realized that large amounts of expensive methyl aluminoxane were needed to form an active metallocene catalyst. This has been a significant impediment to the commercialization of metallocene catalysts.

Fluoro organic borate compounds have been used in place of large amounts of methyl aluminoxane. However, this is not satisfactory, since borate compounds are very sensitive to poisons and decomposition, and can also be very expensive.

It should also be noted that having a heterogeneous catalyst is important. This is because heterogeneous catalysts are required for most modern commercial polymerization processes. Furthermore, heterogeneous catalysts can lead to the formation of substantially uniform polymer particles that have a high bulk density. These types of substantially uniform particles are desirable because they improve the efficiency of polymer production and transportation. Efforts have been made to produce heterogeneous metallocene catalysts; however, these catalysts have not been entirely satisfactory.

There is a need in the propylene polymer industry to activate metallocenes more efficiently and economically.

An object of this invention is to provide a process to polymerize propylene to produce a propylene polymer.

Another object of this invention is to provide the propylene polymer produced by the process.

These objects, and other objects, will become more apparent to those with ordinary skill in the art after reading this disclosure.

SUMMARY OF THE INVENTION

In accordance with an embodiment of this invention, a process is provided to produce a propylene polymer. The term "propylene polymer" means both a propylene homopolymer and a propylene copolymer. The process comprises contacting at least one organometal compound, at least one organoaluminum compound, at least one treated solid oxide compound, propylene, and ethylene in a polymerization zone under polymerization conditions to produce a propylene polymer;

wherein the organometal compound has the following general formula:

$$(X^1)(X^2)(X^3)(X^4)M^1$$

wherein $M^1$ is selected from the group consisting of titanium, zirconium, and hafnium;

wherein $(X^1)$ and $(X^2)$ are independently selected from the group consisting of cyclopentadienyls, indenyls, fluorenyls, substituted cyclopentadienyls, substituted indenyls, and substituted fluorenyls;

wherein substituents on the substituted cyclopentadienyls, substituted indenyls, and substituted fluorenyls of $(X^1)$ and $(X^2)$ are selected from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen;

wherein at least one substituent on $(X^1)$ and $(X^2)$ is a bridging group which connects $(X^1)$ and $(X^2)$;

wherein $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups; and wherein the organoaluminum compound has the following general formula:

$$Al(X^5)_n(X^6)_{3-n}$$

wherein $(X^5)$ is a hydrocarbyl having from 1–20 carbon atoms;

wherein $(X^6)$ is a halide, hydride, or alkoxide;

wherein "n" is a number from 1 to 3 inclusive; and wherein the treated solid oxide compound is produced by a process comprising: a) contacting at least one solid oxide compound with at least one electron-withdrawing anion source compound; and b) calcining the solid oxide compound before, during, or after contacting the electron-withdrawing anion source compound to produce the treated solid oxide compound.

In accordance with another embodiment of this invention, the propylene polymer is provided.

DETAILED DESCRIPTION OF THE INVENTION

In this invention, a process to produce a propylene polymer is provided. The process comprises contacting at least one organometal compound, at least one organoaluminum compound, at least one treated solid oxide compound, propylene, and ethylene in a polymerization zone under polymerization conditions to produce the propylene polymer.

Organometal compounds used in this invention have the following general formula:

$$(X^1)(X^2)(X^3)(X^4)M^1$$

In this formula, $M^1$ is selected from the group consisting of titanium, zirconium, and hafnium. Currently, it is most preferred when $M^1$ is zirconium.

In this formula, $(X^1)$ and $(X^2)$ are independently selected from the group consisting of cyclopentadienyls, indenyls, fluorenyls, substituted cyclopentadienyls, substituted indenyls, such as, for example, tetrahydroindenyls, and substituted fluorenyls, such as, for example, octahydrofluorenyls.

Substituents on the substituted cyclopentadienyls, substituted indenyls, and substituted fluorenyls of $(X^1)$ and $(X^2)$ can be selected independently from the group consisting of aliphatic groups, cyclic groups, combinations of aliphatic and cyclic groups, silyl groups, alkyl halide groups, halides, organometallic groups, phosphorus groups, nitrogen groups, silicon, phosphorus, boron, germanium, and hydrogen, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Substituted silyl groups include, but are not limited to, alkylsilyl groups where each alkyl group contains from 1 to about 12 carbon atoms, arylsilyl groups, and arylalkylsilyl groups. Suitable alkyl halide groups have alkyl groups with 1 to about 12 carbon atoms. Suitable organometallic groups include, but are not limited to, substituted silyl derivatives, substituted tin groups, substituted germanium groups, and substituted boron groups.

Suitable examples of such substituents are methyl, ethyl, propyl, butyl, tert-butyl, isobutyl, amyl, isoamyl, hexyl, cyclohexyl, heptyl, octyl, nonyl, decyl, dodecyl, 2-ethylhexyl, pentenyl, butenyl, phenyl, chloro, bromo, iodo, trimethylsilyl, and phenyloctylsilyl.

The organometal compound must have at least one substituent on $(X^1)$ and $(X^2)$ which serves as a bridging group which connects $(X^1)$ and $(X^2)$. This bridging group consists of one, two, or three connecting atoms which also can have substituents selected from the group consisting of aliphatic groups, cyclic groups, combinations of aliphatic and cyclic groups, silyl groups, alkyl halide groups, halides, and organometallic groups as long as the bridging group does not substantially, and adversely, affect the activity of the catalyst composition. The connecting atoms are selected from the group of carbon, silicon, germanium, tin, nitrogen, phosphorous or boron, and combinations thereof. Suitable bridging groups include, but are not limited to, aliphatic groups, cyclic groups, combinations of aliphatic groups and cyclic groups, phosphorous groups, nitrogen groups, organometallic groups, silicon, phosphorus, boron, and germanium. Suitable examples of aliphatic groups are hydrocarbyls, such as, for example, paraffins and olefins. Suitable examples of cyclic groups are cycloparaffins, cycloolefins, cycloacetylenes, and arenes. Suitable organometallic groups include, but are not limited to, substituted silyl derivatives, substituted tin groups, substituted germanium groups, and substituted boron groups. Examples of particularly preferred bridging groups include dimethylsilyl, isopropylidenyl, 1,2 ethylidenyl, diphenyl germanium, and the like.

In this formula, $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups, as long as these groups do not substantially, and adversely, affect the polymerization activity of the catalyst composition.

Suitable examples of aliphatic groups are hydrocarbyls, such as, for example, paraffins and olefins. Suitable examples of cyclic groups are cycloparaffins, cycloolefins, cycloacetylenes, and arenes. Currently, it is preferred when $(X^3)$ and $(X^4)$ are selected from the group consisting of halides and hydrocarbyls, where such hydrocarbyls have from 1 to about 10 carbon atoms. However, it is most preferred when $(X^3)$ and $(X^4)$ are selected from the group consisting of fluoro, chloro, and methyl.

Various processes are known to make these organometal compounds. See, for example, U.S. Pat. Nos. 4,939,217; 5,210,352; 5,436,305; 5,401,817; 5,631,335; 5,571,880; 5,191,132; 5,480,848; 5,399,636; 5,565,592; 5,347,026; 5,594,078; 5,498,581; 5,496,781; 5,563,284; 5,554,795; 5,420,320; 5,451,649; 5,541,272; 5,705,478; 5,631,203; 5,654,454; 5,705,579; and 5,668,230; the entire disclosures of which are hereby incorporated by reference.

Specific examples of such organometal compounds are as follows:

1,2-ethanediylbis($\eta^5$-1-indenyl)di-n-butoxyhafnium;

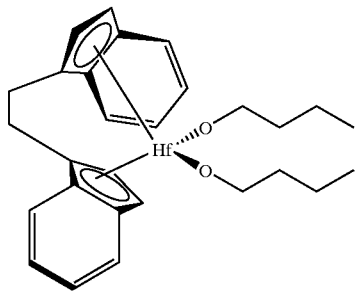

1,2-ethanediylbis($\eta^5$-1-indenyl)dimethylzirconium;

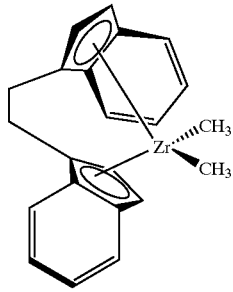

3,3-pentanediylbis($\eta^5$-4,5,6,7-tetrahydro-1-indenyl)
hafnium dichloride;

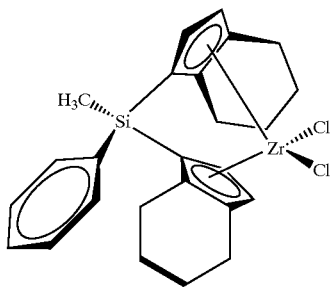

methylphenylsilylbis($\eta^5$-4,5,6,7-tetrahydro-1-indenyl)
zirconium dichloride;

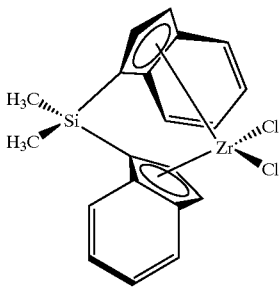

dimethylsilylbis(1-indenyl)zirconium dichloride;

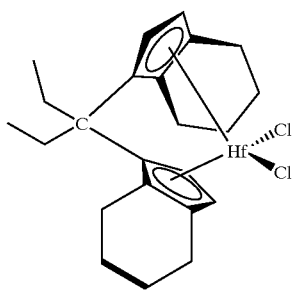

octylphenylsilylbis(1-indenyl)hafnium dichloride;

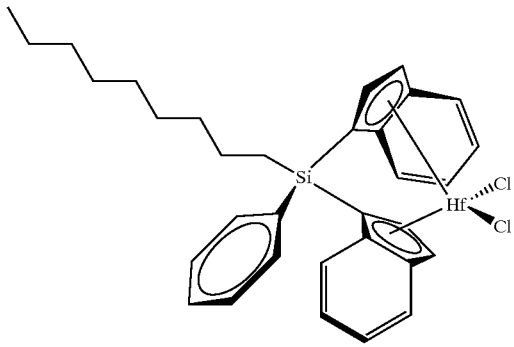

dimethylsilylbis($\eta^5$-4,5,6,7-tetrahydro-1-indenyl)zirconium
dichloride;

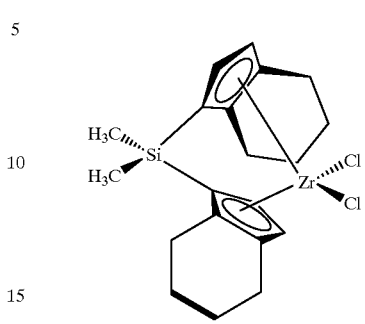

dimethylsilylbis(2-methyl-1-indenyl)zirconium dichloride;

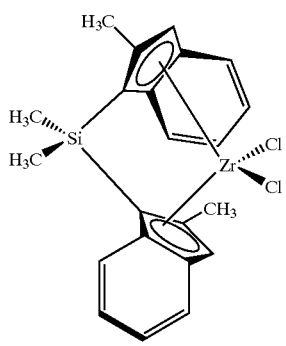

1,2-ethanediylbis(9-fluorenyl)zirconium dichloride; and

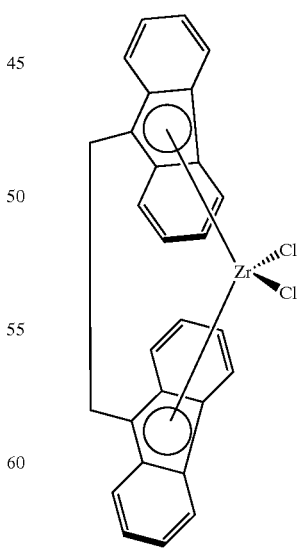

methyloctylsilyl bis(9-fluorenyl)zirconium dichloride;

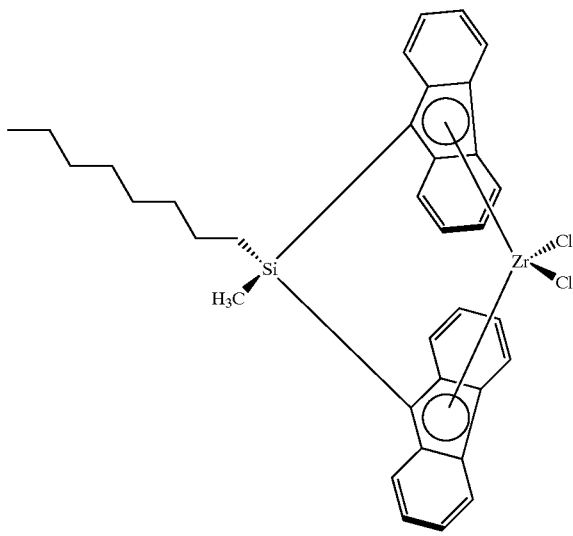

Preferably, the organometal compound is selected from the group consisting of:
dimethylsilylbis(1-indenyl)zirconium dichloride;

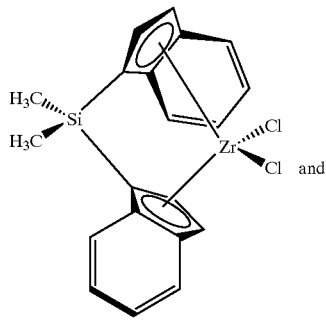

and dimethylsilylbis(2-methyl-1-indenyl)zirconium dichloride;

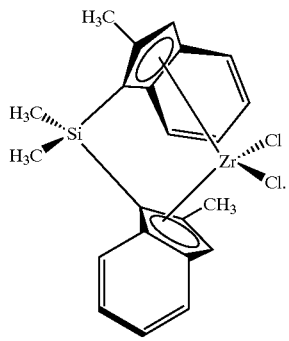

Organoaluminum compounds have the following general formula:

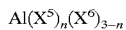

$Al(X^5)_n(X^6)_{3-n}$

In this formula, $(X^5)$ is a hydrocarbyl having from 1 to about 20 carbon atoms. Currently, it is preferred when $(X^5)$ is an alkyl having from 1 to about 10 carbon atoms. However, it is most preferred when $(X^5)$ is selected from the group consisting of methyl, ethyl, propyl, butyl, and isobutyl.

In this formula, $(X^6)$ can be an alkyl having from 1 to about 10 carbon atoms, or a halide, hydride, or alkoxide. Currently, it is preferred when $(X^5)$ and $(X^6)$ are the same.

In this formula, "n" is a number from 1 to 3 inclusive. However, it is preferred when "n" is 3.

Examples of such compounds are as follows:
trimethylaluminum;
triethylaluminum (TEA);
tripropylaluminum;
diethylaluminum ethoxide;
tributylaluminum;
diisobutylaluminum hydride;
triisobutylaluminum hydride;
triisobutylaluminum; and
diethylaluminum chloride.

Currently triisobutyl aluminum is preferred.

Treated solid oxide compounds are compounds that have had their Lewis acidity increased. The treated solid oxide compound can be produced by a process comprising contacting at least one solid oxide compound with at least one electron-withdrawing anion source to form an anion-containing solid oxide compound. The solid oxide compound is calcined either prior to, during, or after contacting with the electron-withdrawing anion source. Calcining is discussed later in this disclosure.

Generally, the specific surface area of the solid oxide compound after calcining at 500° C. is from about 100 to about 1000 m²/g, preferably, from about 200 to about 800 m²/g, and most preferably, from 250 to 600 m²/g.

The specific pore volume of the solid oxide compound is typically greater than about 0.5 cc/g, preferably, greater than about 0.8 cc/g, and most preferably, greater than 1.0 cc/g.

It is preferred when the treated solid oxide compound comprises oxygen and at least one element selected from the group consisting of groups IIA-VIIIA and IB-VIIB of the Periodic Table of Elements, including lanthanides and actinides. However, it is preferred when the element is selected from the group consisting of Al, B, Be, Bi, Cd, Co, Cr, Cu, Fe, Ga, La, Mn, Mo, Ni, Sb, Si, Sn, Sr, Th, Ti, V, W, P, Y, Zn and Zr. It is important that these treated solid oxide compounds have electron withdrawing ability, while not wanting to be bound by theory, it is believed that a treated solid oxide compound should have a higher Lewis acidity compared to the untreated solid oxide compound. However, it is hard to accurately measure the Lewis acidity of these treated, and untreated solid oxide compounds so various methods have been used. Currently, comparing the activities of treated, and untreated solid oxide compounds under acid catalyzed reactions is preferred.

Treated solid oxide compounds can be produced in a variety of ways, such as, for example, by gelling, co-gelling, or impregnation of one compound onto another.

In general, it is preferred to contact at least one solid oxide compound, such as, for example, alumina, zirconia, titania, and mixtures thereof, such as, for example, silica-alumina, with at least one electron-withdrawing anion source compound, to form an anion-containing solid oxide compound, followed by calcining the anion-containing solid oxide compound to form a treated solid oxide compound. In the alternative, a solid oxide compound and an electron-withdrawing anion source compound can be contacted and calcined simultaneously.

The electron-withdrawing anion source compound is any compound that increases the Lewis acidity of the solid oxide under the conditions given herein for producing the treated solid oxide compound. These electron-withdrawing anion source compounds increase the Lewis acidity of the solid oxide compound by contributing to the formation of an electron withdrawing anion, such as, for example, sulfates, halides, and triflate. It should be noted that one or more different electron withdrawing anion source compounds can be used.

The acidity of the solid oxide compound can be further enhanced by using two, or more, electron-withdrawing anion source compounds in two, or more, separate contacting steps. An example of such a process is contacting at least one solid oxide compound with a first electron-withdrawing anion source compound to form a first anion-containing solid oxide compound, followed by calcining the first anion-containing solid oxide compound, followed by contacting with a second electron-withdrawing anion source compound to form a second anion-containing solid oxide compound, followed by calcining the second anion-containing solid oxide compound to form a treated solid oxide compound. It should be noted that the first and second electron-withdrawing anion source compounds can be the same, but are preferably different.

Suitable examples of solid oxide compounds include, but are not limited to, $Al_2O_3$, $B_2O_3$, BeO, $Bi_2O_3$, CdO, $Co_3O_4$, $Cr_2O_3$, CuO, $Fe_2O_3$, $Ga_2O_3$, $La_2O_3$, $Mn_2O_3$, $MoO_3$, NiO, $P_2O_5$, $Sb_2O_5$, $SiO_2$, $SnO_2$, SrO, $ThO_2$, $TiO_2$, $V_2O_5$, $WO_3$, $Y_2O_3$, ZnO, $ZrO_2$: and mixtures thereof, such as, for example, silica-alumina and silica-zirconia. It should be noted that solid oxide compounds that comprise Al—O bonds are currently preferred.

Before, during or after calcining, the solid oxide compound can be contacted with an electron-withdrawing anion source compound. The electron-withdrawing anion source compound can be selected from the group consisting of at least one halogen-containing compound, sulfate-containing compound, or triflate-containing compound. The halogen-containing compound is selected from the group consisting of chlorine-containing compounds, bromine-containing compounds, and fluorine-containing compounds. The halogen-containing compound can be in a liquid phase, or preferably, a vapor phase. Optionally, the solid oxide compound can be calcined at about 100 to about 900° C. before being contacted with the halogen-containing compound.

Any method known in the art of contacting the solid oxide compound with the fluorine-containing compound can be used in this invention. A common method is to impregnate the solid oxide compound with an aqueous solution of a fluoride-containing salt before calcining, such as ammonium fluoride [$NH_4F$], ammonium bifluoride [$NH_4HF_2$], hydrofluoric acid [HF], ammonium silicofluoride [$(NH_4)_2SiF_6$], ammonium fluoroborate [$NH_4BF_4$], ammonium fluorophosphate [$NH_4PF_6$], and mixtures thereof.

In a second method, the fluorine-containing compound can be dissolved into an organic compound, such as an alcohol, and added to the solid oxide compound to minimize shrinkage of pores during drying. Drying can be accomplished by any method known in the art, such as, for example, vacuum drying, spray drying, flashing drying, and the like.

In a third method, the fluorine-containing compound can be added during the calcining step. In this technique, the fluorine-containing compound is vaporized into the gas stream used to fluidize the solid oxide compound so that it is fluorided from the gas phase. In addition to some of the fluorine-containing compounds described previously, volatile organic fluorides may be used at temperatures above their decomposition points, or at temperatures high enough to cause reaction. For example, perfluorohexane, perfluorobenzene, trifluoroacetic acid, trifluoroacetic anhydride, hexafluoroacetylacetonate, and mixtures thereof can be vaporized and contacted with the solid oxide compound at about 300 to about 600° C. in air or nitrogen. Inorganic fluorine-containing compounds can also be used, such as hydrogen fluoride or even elemental fluorine.

Generally, the amount of fluorine present is about 2 to about 50 weight percent fluorine based on the weight of the treated solid oxide compound before calcining or the amount added to a precalcined solid oxide compound. Preferably, it is about 3 to about 25 weight percent, and most preferably, it is 4 to 20 weight percent fluorine based on the weight of the treated solid oxide compound before calcining or the amount added to a precalcined solid oxide compound.

Any method known in the art of contacting the solid oxide compound with the chlorine-containing compound or bromine-containing compound can be used in this invention. Generally, the contacting is conducted during or after calcining, preferably during calcining. Any suitable chlorine-containing compound or bromine-containing compound that can deposit chlorine or bromine or both on the solid oxide compound can be used. Suitable chlorine-containing compounds and bromine-containing compound include volatile or liquid organic chloride or bromide compounds and inorganic chloride or bromide compounds. Organic chloride or bromide compounds can be selected from the group consisting of carbon tetrachloride, chloroform, dichloroethane, hexachlorobenzene, trichloroacetic acid, bromoform, dibromomethane, perbromopropane, phosgene, and mixtures thereof. Inorganic chloride or bromide compounds can be selected from the group consisting of gaseous hydrogen chloride, silicon tetrachloride, tin tetrachloride, titanium tetrachloride, aluminum trichloride, boron trichloride, thionyl chloride, sulfuryl chloride, hydrogen bromide, boron tribromide, silicon tetrabromide, and mixtures thereof. Additionally, chlorine and bromine gas can be used.

If an inorganic chlorine-containing compound or bromine-containing compound is used, such as titanium tetrachloride, aluminum trichloride, or boron trichloride, it also can be possible to contact the chlorine-containing compound or bromine-containing compound with the solid oxide compound after calcining, either by vapor phase deposition or even by using an anhydrous solvent.

Generally, the amount of chlorine or bromine used is from about 0.01 to about 10 times the weight of the treated solid oxide compound before calcining or the amount added to a precalcined solid oxide compound, preferably it is from about 0.05 to about 5 times, most preferably from 0.05 to 1 time the weight of the treated solid oxide compound before calcining or the amount added to a precalcined solid oxide compound.

The treated solid oxide compound also can be produced by a process comprising contacting at least one solid oxide compound with at least one electron-withdrawing anion source and at least one metal salt compound. In general, it is preferred to contact at least one solid oxide compound, such as, for example, alumina, zirconia, titania, and mixtures thereof, or with mixtures of other solid oxide compounds such as, for example, silica-alumina, with at least one metal salt compound and at least one electron-withdrawing anion source compound, to form an anion- and metal-containing solid oxide compound. The anion- and metal-containing solid oxide compound then is calcined to form a treated solid oxide compound. In the alternative, a solid oxide compound, a metal salt compound, and an electron-withdrawing anion source compound can be contacted and cacined simultaneously. In another alternative, the metal salt compound and the electron-withdrawing anion source compound can be the same compound.

The metal salt compound is any compound that increases the Lewis acidity of the solid oxide compound under the conditions given herein for producing the treated solid oxide compound. It is preferred when the metal in the metal salt is selected from the group consisting of groups IIA-VIIIA and IB-VIIB of the Periodic Table of Elements, including lanthanides and actinides. However, it is most preferred when the element is selected from the group consisting of Al, B, Be, Bi, Cd, Co, Cr, Cu, Fe, Ga, La, Mn, Mo, Ni, Sb, Si, Sn, Sr, Th, Ti, V, W, P, Y, Zn and Zr.

To produce the treated solid oxide compound, at least one metal salt compound can be contacted with the solid oxide compound by any means known in the art to produce a metal-containing solid oxide compound. The metal salt compound can be added to the solid oxide compound before calcining, during calcining, or in a separate step after calcining the solid oxide compound.

Generally, the solid oxide compound is contacted with an aqueous or organic solution of the metal salt compound before calcining. For example, the metal can be added to the solid oxide compound by forming a slurry of the solid oxide compound in a solution of the metal salt compound and a suitable solvent such as alcohol or water. Particularly suitable are one to three carbon atom alcohols because of their volatility and low surface tension. A suitable amount of the solution is utilized to provide the desired concentration of metal after drying. Any water soluble or organic soluble metal salt compound is suitable that can impregnate the solid oxide compound with metal. Drying can be completed by suction filtration followed by evaporation, vacuum drying, spray drying, or flash drying.

If the metal is added to the solid oxide compound after calcination, one preferred method is to impregnate the solid oxide compound with a hydrocarbon solution of the metal salt compound.

Generally, the amount of metal present in the metal-containing solid oxide compound is in a range of about 0.1 to about 30 weight percent metal where the weight percent is based on the weight of the metal-containing solid oxide compound before calcining or the amount added to a pre-calcined solid oxide compound. Preferably, the amount of metal present in the metal-containing solid oxide compound is in a range of about 0.5 to about 20 weight percent metal based on the weight of the metal-containing solid oxide compound before calcining or the amount added to a pre-calcined solid oxide compound. Most preferably, the amount of metal present in the metal-containing solid oxide compound is in a range of 1 to 10 weight percent metal based on the weight of the metal-containing solid oxide compound before calcining or the amount added to a precalcined solid oxide compound.

The metal-containing solid oxide compound then can be contacted with at least one electron-withdrawing anion source compound by the methods discussed previously in this disclosure.

Before, during, or after the solid oxide compound is combined with the metal salt compound or the electron-withdrawing anion source compound, it is calcined for about 1 minute to about 100 hours, preferably from about 1 hour to about 50 hours, and most preferably, from 3 to 20 hours. Generally, the calcining is conducted at a temperature in a range of about 200° C. to about 900° C., preferably from about 300° C. to about 700° C., and most preferably, from 350° C. to 600° C. The calcining can be conducted in any suitable atmosphere. Generally, the calcining can be completed in an inert atmosphere. Alternatively, the calcining can be completed in an oxidizing atmosphere, such as, oxygen or air, or a reducing atmosphere, such as, hydrogen or carbon monoxide.

The method of contacting the organometal compound, the organoaluminum compound, the treated solid oxide compound, the propylene, and ethylene is important in establishing polymerization activity. It is most important that the propylene be used early in the contacting of the organometal compound, the treated solid oxide compound, and the organoaluminum compound.

One preferred method of contacting is to pre-contact the treated solid oxide compound and the propylene to produce a first mixture, then the first mixture is contacted with the organometal compound, organoaluminum compound, and ethylene. In this method, the organometal compound can also be pre-contacted with the organoaluminum compound before being allowed to react with the first mixture and ethylene.

A second preferred method of contacting is to substantially simultaneously contact the organometal compound, the organoaluminum compound, the treated solid oxide compound, propylene and ethylene. In this method, the organometal compound, the organoaluminum compound, and the treated solid oxide compound contact propylene before substantially contacting each other since there is a larger quantity of propylene added to the polymerization zone.

A weight ratio of the organoaluminum compound to the treated solid oxide compound in the catalyst composition ranges from about 5:1 to about 1:1000, preferably, from about 3:1 to about 1:100, and most preferably, from 1:1 to 1:50.

A weight ratio of the treated solid oxide compound to the organometal compound in the catalyst composition ranges from about 10,000:1 to about 1:1, preferably, from about 1000:1 to about 10:1, and most preferably, from 250:1 to 20:1. These ratios are based on the amount of the components combined to give the catalyst composition.

Generally, when small amounts of ethylene are added in this invention, the propylene polymer produced has substantially identical properties to that of a propylene homopolymer. To obtain this result, generally, the amount of ethylene added to the polymerization zone is that which results in less than 1 wt % ethylene incorporation in the polymer. Preferably, the amount of ethylene added to the polymerization zone is that which results in about 0.1 wt % to about 1 wt % ethylene incorporation in the propylene polymer, preferably about 0.5 to about 1 wt % ethylene incorporation in the propylene polymer, and most preferably, 0.6 to 0.8 wt % ethylene incorporation. To obtain these levels of ethylene incorporation in the propylene polymer, generally, the amount of ethylene added in the polymerization zone ranges from about 600 ppm by weight to about 1200 ppm by weight per million parts of liquid propylene, preferably from about 800 ppm by weight to about 1000 ppm by weight, and most preferably from 850 ppm by weight to 950 ppm by weight per million parts of liquid propylene.

In another embodiment, the amount of ethylene added can be described as an amount effective to increase the activity of a catalyst system comprising the organometal compound, the organoaluminum compound, and the treated solid oxide compound by at least 5%, preferably, by at least 10%, most preferably, by at least 25%.

In yet another embodiment, the amount of ethylene added can be described as an amount effective to increase the activity of a catalyst system comprising the organometal compound, the organoaluminum compound, and the treated solid oxide compound by at least 5% but below that which would reduce polymer isotacticity below 90 s. Preferably, the amount of ethylene added is an amount effective to increase the activity by at least 10%, but below that which would reduce polymer isotacticity below 90 s. Most preferably, the amount of ethylene added is an amount effective to increase the activity at least 25%, but below that which would reduce polymer isotacticity below 90 s.

When larger amounts of ethylene are added to the polymerization zone in this invention, the ethylene incorporation increases, and the resulting polymers are ethylene-propylene random copolymers. Ethylene-propylene random copolymers have greater than 1 wt % ethylene incorporation.

One of the important aspects of this invention is that no aluminoxane needs to be added in this invention to activate the organometal compound. Aluminoxane is an expensive compound that greatly increases propylene polymer production costs. This also means that no water is needed to help form such aluminoxanes. This is beneficial because water can sometimes kill a polymerization process. Additionally, it should be noted that no fluoro organic borate compounds are required. It should be noted that organochromium compounds and $MgCl_2$ are also not required in this invention. Although aluminoxane, fluoro organic borate compounds, organochromium compounds, or $MgCl_2$ are not needed in the preferred embodiments, these compounds can be used in other embodiments of this invention.

Processes that can polymerize propylene to produce propylene polymers are known in the art, such as, for example, slurry polymerization, gas phase polymerization, and solution polymerization. It is preferred to perform a slurry polymerization in a loop reactor. Furthermore, it is even more preferred to use liquid propylene as the diluent in a slurry polymerization. Examples of such technology can be found in U.S. Pat. Nos. 4,424,341; 4,501,885; 4,613,484; 4,737,280; and 5,597,892; the entire disclosures of which are hereby incorporated by reference.

It should be noted that under slurry polymerization conditions, this process polymerizes liquid propylene alone, or liquid propylene with ethylene very well. In particular, this process produces good quality propylene polymer particles without substantially fouling the reactor.

After the propylene polymers are produced, they can be formed into various articles, such as, for example, household containers and utensils, drums, fuel tanks, pipes, geomembranes, and liners. Various processes can form these manufactures. Usually, additives and modifiers are added to the propylene polymer in order to provide desired effects. By using the invention described herein, articles can be produced at a lower cost than when activation of the organometal compound is completed using aluminoxanes, fluoro organic borate compounds, organochromium compounds, or $MgCl_2$, while maintaining most, if not all, of the unique properties of propylene polymers produced with metallocene catalysts.

EXAMPLES

These examples provide additional information to a person skilled in the art. These examples are not meant to be construed as limiting the scope of the claims.

Test Methods

Melt Flow Index (MF) in grams of polymer per ten minutes was determined in accordance with ASTM D1238, condition 190/2, at 190° C. with a 21,600 gram weight.

Bulk densities were determined in lbs/ft by weighing a 100 mL graduated cylinder in which polymer fluff had been lightly tapped.

Isotacticity and ethylene incorporation into the propylene polymer were determined by $C_{13}$NMR. The spectra were taken using standard accepted spectroscopy techniques. The propylene polymer was dissolved in trichlorobenzene, and the spectra was taken with respect to an internal standard relative to hexamethylsiloxane which has a known reference point relative to tetramethyl silane. From the observed integrals of the relevant peaks, the details regarding the microstructure of the propylene polymer were calculated.

Calcining Procedure

To calcine a material, about 10 grams were placed in a 1.75 inch quartz tube fitted with a sintered quartz disk at the bottom. While the material was supported on the disk, dry air was blown up through the disk at the linear rate of about about 1.6 to about 1.8 standard cubic feet per hour. An electric furnace around the quartz tube was then turned on, and the temperature was raised at the rate of 400° C. per hour to the indicated temperature, such as 600° C. At that temperature, the material was allowed to fluidize for three hours in the dry air. Afterward, the material was collected and stored under dry nitrogen, where it was protected from the atmosphere until ready for testing.

Preparation of the Treated Solid Oxide Compound

A solution of 200 milliliters of deionized water, 20.9 grams of zinc chloride, and 1 milliliter of nitric acid was made and impregnated onto a 100 gram sample of Ketjen Grade B alumina to produce a zinc-containing alumina. Thus, the zinc chloride loading was 20% by weight of the alumina. The zinc-containing alumina then was dried overnight under vacuum at 110° C. The zinc-containing alumina then was calcined in dry air at 600° C. for three hours to convert the zinc to a mixed oxide to produce a calcined, zinc-containing alumina. Then, 27.56 grams of the calcined, zinc-containing alumina were heated under nitrogen to 600° C. again and while still at 600° C., 3 milliliters of carbon tetrachloride were injected into the gas stream ahead of the sample bed so that as the carbon tetrachloride evaporated it was carried up through the heated zinc-containing alumina bed to produce a chlorided, zinc-containing alumina. The chlorided, zinc-containing alumina then was stored under dry nitrogen and later tested for polymerization activity.

Polymerization Procedure

Liquid propylene was polymerized in a four liter stainless steel autoclave reactor equipped with a mechanical stirrer and automated temperature control. First, solid rac-dimethylsilybis(2-methyl-1-indenyl)zirconium dichloride was charged to the reactor promptly followed by the treated solid oxide compound. Immediately, thereafter, 2 millilters of a 25 wt % solution of triiisobutylaluminum in heptane were charged to the reactor. The reactor was then sealed, and immediately, thereafter, ethylene was added until the indicated pressure in Table 1 was reached. The reactor then was filled promptly ⅔ full with liquid propylene at room temperature. Due to the rate of addition of these components, the treated solid oxide contacted the propylene prior to contacting the other components. The reactor temperature then was raised to 70° C., and the polymerization reaction proceeded for one hour. The amounts of organometal compound, treated solid oxide compound, and propylene polymer produced are shown in Table 1. In addition, the melt flow, bulk density, wt % ethylene incorporation, and isotacticity of the propylene polymer are also shown in Table 1.

| Run # | Organometal Compound (g) | Treated Solid Oxide Compound (g) | Ethylene (psi) | Polymer (g) | Activity* | Melt Flow Index | Bulk Density (lb/ft³) | Wt % Ethylene in polymer | Polymer Isotacticity (mm) |
|---|---|---|---|---|---|---|---|---|---|
| 100 | 0.0089 | 0.0508 | 0 | 98.9 | 1946 | 34.7 | 26.5 | 0 | 91.5 |
| 110 | 0.0105 | 0.0484 | 3 | 105.3 | 2176 | 45.4 | 26.9 | 0.5 | 90.3 |
| 120 | 0.0094 | 0.0498 | 5 | 183.9 | 3693 | 73.8 | 26.2 | 0.6 | 91.5 |
| 130 | 0.0094 | 0.0519 | 10 | 187.9 | 3620 | 37.2 | 26.3 | 1.1 | 89.6 |
| 140 | 0.0083 | 0.0504 | 20 | 151.7 | 3009 | 178 | — | 2.1 | 88.5 |

*Activity - grams of polymer per gram of treated solid oxide compound per hour

Polymerization Results

From the data, it is shown that addition of small amounts of ethylene to the reactor greatly increases polymerization activity. For example, in Run 100, when no ethylene was added, the activity was 1946 grams of propylene polymer per gram of treated solid oxide compound per hour. However, in Runs 10, 120, and 130, when 3, 5, and 10 psig of ethylene were added respectively, the activity increased to 2176, 3693, and 3620 grams of propylene polymer per gram of treated solid oxide compound per hour respectively. Furthermore, the addition of small amounts of ethylene did not signficantly decrease the meso content of the propylene polymer as shown by the isotacticity values. For example, in Run 100, when no ethylene was added, the isotacticity was 91.5 mm. In Runs 110 and 120, when 3 to 5 psig of ethylene was added, the isotacticity was almost the same as in Run 100 at 90.3 mm and 91.5 mm respectively. Therefore, the properties of the propylene polymer produced in Runs 110 and 120 are substantially identical to a propylene homopolymer.

When larger amounts of ethylene are added to the reactor, an ethylene-propylene random copolymer is produced. For example, in Runs 130 and 140, when 10 psig and 20 psig of ethylene were added to the reactor, 1.1 wt % and 2.1 wt % ethylene were incorporated in the ethylene-propylene copolymer, and the expected decrease in meso content was observed.

While this invention has been described in detail for the purpose of illustration, it is not intended to be limited thereby but is intended to cover all changes and modifications within the spirit and scope thereof.

That which is claimed is:

1. A polymerization process for producing propylene polymer, said process comprising:

(a) contacting at least one organometal compound, at least one organoaluminum compound, at least one treated solid oxide compound, propylene, and ethylene in a manner such that the organometal compound, the at least one organoaluminum compound, and the at least one treated solid oxide compound contact the propylene before contacting each other; or alternatively, (b) pre-contacting the treated solid oxide compound and the propylene to produce a first mixture prior to contacting said first mixture with said at least one organometal compound, said organoaluminum compound, and ethylene;

polymerizing said propylene in a polymerization zone under polymerization conditions to produce said propylene polymer; and wherein the amount of ethylene added to said polymerization zone is that which results in less than 1% by weight ethylene incorporation in said propylene polymer;

wherein said organometal compound has the following general formula:

$(X^1)(X^2)(X^3)(X^4)M^1$ wherein $M^1$ is selected from the group consisting of titanium, zirconium, and hafnium;

wherein $(X^1)$ and $(X^2)$ are independently selected from the group consisting of cyclopentadienyls, indenyls, fluorenyls, substituted cyclopentadienyls, substituted indenyls, and substituted fluorenyls;

wherein substituents on said substituted cyclopentadienyls, substituted indenyls, and substituted fluorenyls of $(X^1)$ and $(X^2)$ are selected from the group consisting of aliphatic groups, cyclic groups, combinations of aliphatic and cyclic groups, silyl groups, halide substituted alkyl groups, halides, organometallic groups, phosphorus groups, nitrogen groups, boron groups, and germanium groups;

wherein any substituent on $(X^1)$ and $(X^2)$ is optionally a bridging group which connects $(X^1)$ and $(X^2)$;

wherein $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups; and wherein said organoaluminum compound has the following general formula:

$Al(X^5)_n(X^6)_{3-n}$ wherein $(X^5)$ is a hydrocarbyl having from 1–20 carbon atoms;

wherein $(X^6)$ is a halide, hydride, or alkoxide;

wherein "n" is a number from 1 to 3 inclusive; and wherein said treated solid oxide compound is produced by a process comprising: a) contacting at least one solid oxide compound with at least one electron-withdrawing anion source compound or at least one metal salt compound; and b) calcining said solid oxide compound before, during, or after contacting said electron-withdrawing anion source compound or said metal salt compound to produce said treated solid oxide compound.

2. A process according to claim 1 wherein said organometal compound is selected from the group consisting of dimethylsilylbis(1-indenyl) zirconium dichloride and dimethylsilylbis(2-methyl-1-indenyl)zirconium dichloride.

3. A process according to claim 1 wherein said organoaluminum compound is selected from the group consisting of trimethylaluminum, triethylaluminum, tripropylaluminum, tributylaluminum, diethylaluminum ethoxide, diisobutylaluminum hydride, and diethylaluminum chloride.

4. A process according to claim 3 wherein said organoaluminum compound is triethylaluminum or tributylaluminum.

5. A process according to claim 1 wherein said treated solid oxide compound is produced by a process comprising: a) contacting at least one solid oxide compound with at least one electron-withdrawing anion source compound; b) contacting said solid oxide compound with at least one metal salt compound; and c) calcining said solid oxide compound before, during, or after contacting said electron-withdrawing anion source compound and said metal salt compound to produce said treated solid oxide compound.

6. A process according to claim 5 wherein said treated solid oxide compound is a chlorided, zinc-containing alumina.

7. A process according to claim 1 wherein the at least one organometal compound, the at least one organoaluminum compound, the at least one treated solid oxide compound are contacted in a manner such that the organometal compound, the at least one organoaluminum compound and the at least one treated solid oxide compound contact the propylene before contacting each other.

8. A process according to claim 1 wherein a weight ratio of said organoaluminum compound to said treated solid oxide compound ranges from about 3:1 to about 1:100.

9. A process according to claim 8 wherein said weight ratio of said organoaluminum compound to said treated solid oxide compound in said catalyst composition ranges from 1:1 to 1:50.

10. A process according to claim 1 wherein a weight ratio of said treated solid oxide compound to said organometal compound in said catalyst composition ranges from about 1000:1 to about 10:1.

11. A process according to claim 10 wherein said weight ratio of said treated solid oxide compound to said organometal compound in said catalyst composition ranges from 250:1 to 20:1.

12. A process according to claim 1 wherein the amount of ethylene added to said polymerization zone is that which results in about 0.5% by weight to about 1% by weight ethylene incorporation in said propylene polymer.

13. A process according to claim 12 wherein the amount of ethylene added to said polymerization zone is that which results in 0.6 to 0.8 wt % ethylene incorporation in said propylene polymer.

14. A process according to claim 1 wherein the amount of ethylene added in the polymerization zone ranges from about 600 ppm by weight to about 1200 ppm by weight per million parts of liquid propylene.

15. A process according to claim 14 wherein the amount of ethylene added in the polymerization zone ranges from 850 ppm by weight to 950 ppm by weight per million parts of liquid propylene.

16. A process according to claim 1 wherein the amount of ethylene added to said polymerization zone is that which results in greater than 1% by weight ethylene incorporation in said propylene polymer.

17. A process according to claim 1 wherein the amount of ethylene added is that which is effective to increase the activity of a catalyst system comprising the organometal compound, the organoaluminum compound, and the treated solid oxide compound by at least 5%.

18. A process according to claim 17 wherein the amount of ethylene added is that which is effective to increase the activity of a catalyst system comprising the organometal compound, the organoaluminum compound, and the treated solid oxide compound by at least 25%.

19. A process according to claim 1 wherein the amount of ethylene added is that which is effective to increase the activity of a catalyst system comprising the organometal compound, the organoaluminum compound, and the treated solid oxide compound by at least 5% but below that which would reduce polymer isotacticity below 90 s.

20. A process according to claim 19 wherein the amount of ethylene added is that which is effective to increase the activity of a catalyst system comprising the organometal compound, the organoaluminum compound, and the treated solid oxide compound by at least 10% but below that which would reduce polymer isotacticity below 90 s.

21. process according to claim 1 wherein said polymerization conditions comprise slurry polymerization conditions.

22. A process according to claim 21 wherein said contacting is conducted in a loop reaction zone.

23. A process according to claim 22 wherein said contacting is conducted in the presence of a diluent that comprises, in major part, propylene.

24. A polymer produced by the process of claim 1.

25. A process for producing propylene polymer, said process comprising:

contacting at least one organometal compound, at least one organoaluminum compound, at least one treated solid oxide compound, propylene, and ethylene; wherein said at least one treated solid oxide compound and propylene are pre-contacted to produce a first mixture prior to contacting said first mixture with said at least one organometal compound, said organoaluminum compound, and ethylene; and polymerizing said propylene in a polymerization zone under polymerization conditions to produce said propylene polymer;

wherein said organometal compound has the following general formula:

$(X^1)(X^2)(X^3)(X^4)M^1$ wherein $M^1$ is selected from the group consisting of titanium, zirconium, and hafnium;

wherein $(X^1)$ and $(X^2)$ are independently selected from the group consisting of cyclopentadienyls, indenyls, fluorenyls, substituted cyclopentadienyls, substituted indenyls, and substituted fluorenyls;

wherein substituents on said substituted cyclopentadienyls, substituted indenyls, and substituted fluorenyls of $(X^1)$ and $(X^2)$ are selected from the group consisting of aliphatic groups, cyclic groups, combinations of aliphatic and cyclic groups, silyl groups, halide substituted alkyl groups, halides, organometallic groups, phosphorus groups, nitrogen groups, boron groups, and germanium groups;

wherein any substituent on $(X^1)$ and $(X^2)$ is optionally a bridging group which connects $(X^1)$ and $(X^2)$;

wherein $(X^3)$ and $(X^4)$ are independently selected from the group consisting of halides, aliphatic groups, substituted aliphatic groups, cyclic groups, substituted cyclic groups, combinations of aliphatic groups and cyclic groups, combinations of substituted aliphatic groups and cyclic groups, combinations of aliphatic groups and substituted cyclic groups, combinations of substituted aliphatic groups and substituted cyclic groups, amido groups, substituted amido groups, phosphido groups, substituted phosphido groups, alkyloxide groups, substituted alkyloxide groups, aryloxide groups, substituted aryloxide groups, organometallic groups, and substituted organometallic groups; and wherein said organoaluminum compound has the following general formula:

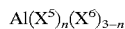

$Al(X^5)_n(X^6)_{3-n}$ wherein ($X^5$) is a hydrocarbyl having from 1–20 carbon atoms;

wherein ($X^6$) is a halide, hydride, or alkoxide;

wherein "n" is a number from 1 to 3 inclusive; and wherein said treated solid oxide compound is produced by a process comprising: a) contacting at least one solid oxide compound with at least one electron-withdrawing anion source compound or at least one metal salt compound; and b) calcining said solid oxide compound before, during, or after contacting said electron-withdrawing anion source compound or said metal salt compound to produce said treated solid oxide compound.

26. A polymerization process for producing a propylene polymer, said process comprising contacting rac-dimethylsilylbis(2-methyl-1-indenyl)zirconium dichloride, a chlorided, zinc-containing alumina, triisobutylaluminum, ethylene and propylene in a polymerization zone under polymerization conditions to produce said propylene polymer, wherein the amount of ethylene added to said polymerization zone is that which results in less than 1% by weight ethylene incorporation in said propylene polymer.

27. A polymer produced by the process of claim 26.

* * * * *